United States Patent Office 3,086,983

Patented Apr. 23, 1963

3,086,983

TETRAKIS (TRIPHENYL OR TRIALKYL) SILOXYVANADIUM

Howard J. Cohen, Cincinnati, Ohio, assignor to National Distillers and Chemical Corporation, New York, N.Y., a corporation of Virginia No Drawing. Filed Mar. 29, 1961, Ser. No. 99,022
3 Claims. (Cl. 260—429)

The present invention relates to novel chemical compounds and, more particularly, to compounds of the following formula:

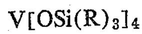

$$V[OSi(R)_3]_4$$

wherein R is a member from the group consisting of alkyl and phenyl radicals and, with reference to the alkyl radicals, those that contain from one to eight carbon atoms such as methyl, ethyl, isopropyl, butyl, t-butyl, isoamyl, hexyl, octyl, 2-ethylhexyl, etc.

Such compounds may, in general, be prepared under an inert atmosphere by reacting the appropriate alkali metal triorganosilanolate with a vanadium tetrahalide e.g., vanadium tetrachloride. Thus, for example tetrakistriphenylsiloxyvanadium can be prepared by reacting sodium triphenylsilanolate with vanadium tetrachloride; tetrakistrimethylsiloxyvanadium by reacting sodium trimethylsilanolate with vanadium tetrachloride, etc.

In order to further describe the invention, the following embodiments are set forth for purposes of illustration and not limitation.

EXAMPLE I

*Tetrakistriphenylsiloxyvanadium*

$$V[OSi(C_6H_5)_3]_4$$

13.8 parts of triphenylsilanol dissolved in 150 ml. of benzene was added to 1.15 parts of sodium diluted with 50 ml. of benzene. The mixture was refluxed for five hours and the resulting mixture was diluted with 100 ml. of benzene followed by addition of 1.9 parts of vanadium tetrachloride dissolved in 100 ml. of benzene. The resulting mixture was then refluxed for six hours, cooled, and filtered. The residual light green solid product was washed successively with water, methanol and pertoleum ether, and dried. The dried product had a melting point of 260° C. and analyzed as follows:

| | C | H | Si | V |
|---|---|---|---|---|
| Found | 75.02 | 5.32 | 9.83 | 4.31 |
| Calculated for $V[OSi(C_6H_5)_3]_4$ | 75.06 | 5.21 | 9.75 | 4.42 |

EXAMPLE II

*Preparation of Tetrakistrimethylsiloxy Vanadium*

60.0 parts of trimethylsilanol dissolved in 100 ml. of benzene was added to 7.4 parts of sodium, as a 50% dispersion in toluene, and diluted with 100 ml. of benzene. The mixture was stirred under reflux for three hours. To the resulting solution was added, over a period of one hour, 15.4 parts of vanadium tetrachloride dissolved in 100 ml. of benzene. This mixture was then refluxed for two hours and cooled, followed by stripping off the solvent under reduced pressure. The residual solid product was washed successively with benzene, petroleum ether and methanol, and then dried. The resulting dried product, upon analysis for vanadium, gave the following:

| | |
|---|---|
| Found | 14.29 |
| Calculated for $V[OSi(CH_3)_3]_4$ | 12.53 |

The compounds embodied herein possess utility as catalysts for polymerization of olefins, as disclosed in my copending application S.N. 841,448, filed September 22, 1959, now U.S. Patent 3,046,268, of which the present application is a continuation-in-part, and as starting materials for preparation of inorganic polymers. Additional applications for the compounds embodied herein include use as catalyst for hydrocarbon conversions, as ingredients for acoustic fireproof tile, and additives for improving burning characteristics of fuel oils.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A compound of the formula $V[OSi(R)_3]_4$ wherein R is a member from the group consisting of alkyl and phenyl radicals.

2. As a new chemical compound, tetrakistriphenylsiloxyvanadium.

3. As a new chemical compound, tetrakistrimethylsiloxyvanadium.

References Cited in the file of this patent

Orlov et al.: "Doklady Akademii Nauk S.S.S.R. (received in Sci. Lib., October 20, 1958) 122, No. 2, pp. 246–249 (U.S.S.R.).

English abstract of the above is: Orlov et al., entitled—Tris-Tris (Triorganosilyl)-Vanadates (Tris(Triorganosilil) vanadaty), in the periodical "Doklady Adademii Nauk S.S.S.R. (1958) 122, No. 2, pp. 246–249 (U.S.S.R.), SOV/20–122–2–22/42, 3 cards.

English abstract: Borisov, entitled—Elemental-Organic Silicon Compounds, in the periodical "Uspeklii khimii 1959, 28, No. 1, pp. 63–95 (U.S.S.R.), SOV/74–28–1–4/5, 12 cards (cards 4, 10 and 11 needed).